(12) United States Patent
Kroner et al.

(10) Patent No.: US 11,169,080 B2
(45) Date of Patent: Nov. 9, 2021

(54) METHOD AND SYSTEM FOR DETERMINING A REMAINING SERVICE LIFE OF A PROCESS DEVICE THROUGH WHICH FLUID FLOWS

(71) Applicant: LINDE AKTIENGESELLSCHAFT, Munich (DE)

(72) Inventors: Andreas Kroner, Wolfratshausen (DE); Martin Pottmann, Wolfratshausen (DE); Oliver Slaby, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 65 days.

(21) Appl. No.: 16/615,593

(22) PCT Filed: May 4, 2018

(86) PCT No.: PCT/EP2018/025135
§ 371 (c)(1),
(2) Date: Nov. 21, 2019

(87) PCT Pub. No.: WO2018/215095
PCT Pub. Date: Nov. 29, 2018

(65) Prior Publication Data
US 2020/0103335 A1 Apr. 2, 2020

(30) Foreign Application Priority Data
May 23, 2017 (EP) .................................. 17020223

(51) Int. Cl.
*G01N 17/00* (2006.01)
*G05B 23/02* (2006.01)

(52) U.S. Cl.
CPC ........ *G01N 17/008* (2013.01); *G05B 23/0283* (2013.01); *G05B 23/0286* (2013.01)

(58) Field of Classification Search
CPC .............. G01N 17/008; G05B 23/0283; G05B 23/0286
(Continued)

(56) References Cited

U.S. PATENT DOCUMENTS 5,429,178 A 7/1995 Garey et al.
5,582,245 A * 12/1996 Niimi .................... F28D 9/0012
165/166
(Continued)

FOREIGN PATENT DOCUMENTS

EP 2887168 A2 6/2015
WO 9516890 A1 6/1995

OTHER PUBLICATIONS

International Search Report for PCT/EP2018/025135 dated Jul. 17, 2018.

*Primary Examiner* — Ly D Pham
(74) *Attorney, Agent, or Firm* — Millen White Zelano & Branigan, PC; Brion P. Heaney

(57) ABSTRACT

A remaining service life of a process-engineering apparatus through which fluid flows and which is embodied as a heat exchanger, column, or container for phase separation is acquired. A computing unit is mounted on the apparatus and coupled to a remote computing unit. Temperature measurement values are obtained by a plurality of sensors arranged in or on the apparatus. Mechanical stress is acquired as a characteristic variable not directly measurable from the measurement values of the temperature. The remaining service life is acquired from the mechanical stress. The mechanical stress is acquired by means of the computing unit and the mechanical stress and/or the temperature measurement values are transmitted to the remote computing unit, and the remaining service life is acquired there. Alternatively, the temperature measurement values are transmit- (Continued)

ted to the remote computing unit, and the mechanical stress and remaining service life are acquired there.

21 Claims, 3 Drawing Sheets

(58) Field of Classification Search
USPC .......................................................... 700/275
See application file for complete search history.

(56) References Cited

U.S. PATENT DOCUMENTS

| | | | |
|---|---|---|---|
| 5,590,706 A | 1/1997 | Tsou et al. | |
| 7,219,044 B1 * | 5/2007 | Prevey | G06F 30/00 |
| | | | 703/7 |
| 9,581,086 B2 | 2/2017 | Tiwari et al. | |
| 2005/0066711 A1 * | 3/2005 | Discenzo | G01N 33/2888 |
| | | | 73/64.56 |
| 2010/0242537 A1 * | 9/2010 | Lochner | F25J 3/04236 |
| | | | 62/644 |
| 2012/0089346 A1 * | 4/2012 | Huyse | G06Q 10/06 |
| | | | 702/34 |
| 2012/0089366 A1 * | 4/2012 | Huyse | G01M 3/00 |
| | | | 702/170 |
| 2014/0261901 A1 * | 9/2014 | Holcomb | F28D 7/06 |
| | | | 148/527 |
| 2014/0262180 A1 * | 9/2014 | Lyon | F28F 9/22 |
| | | | 165/173 |
| 2015/0094988 A1 | 4/2015 | Schumacher et al. | |
| 2015/0176498 A1 | 6/2015 | Tiwari et al. | |
| 2019/0171187 A1 * | 6/2019 | Celia | G05B 23/0221 |
| 2019/0225505 A1 * | 7/2019 | LaRocque | C02F 1/16 |
| 2020/0318548 A1 * | 10/2020 | Zager | F02C 6/08 |

* cited by examiner

METHOD AND SYSTEM FOR DETERMINING A REMAINING SERVICE LIFE OF A PROCESS DEVICE THROUGH WHICH FLUID FLOWS

The invention relates to a method and a system for acquiring a remaining service life of a process-engineering apparatus through which a fluid flows and which is embodied as a heat exchanger or as a column or as a container for phase separation, and to an arrangement composed of such a process-engineering apparatus through which a fluid flows, and of such a system.

PRIOR ART

It is an objective to monitor systems or at least components thereof, in particular apparatuses, by acquiring and evaluating suitable variables such as e.g. oscillations (referred to as condition monitoring), in order preferably to be able to detect disruption, faults, failures etc. as early as possible. This purpose, the system components to be monitored are equipped with suitable sensors in order to measure the suitable variables and feed them to the evaluation means. In particular, oscillations which occur can be related to the system condition in order e.g. to determine a failure probability or remaining service life of components.

However, the monitoring of components whose condition cannot be estimated using sound measurements or oscillation measurements, such as, e.g. in the case of process-engineering apparatuses through which a fluid flows, such as, for example, heat exchangers or columns or containers for phase separation. The material (metal) thereof is also subject to material fatigue, but not owing to vibrations, rather owing to fluctuations in stress.

Although stress levels in material can be calculated by means of finite element method, this cannot be done in real time owing to the complexity and the time required for the calculation, but rather can only take place off-line. Such methods are not very suitable for regular monitoring and determination of the service life.

For example, WO 95/16890 A1 describes a monitoring system for being able to detect power losses of a heat exchanger directly on the basis of fouling, wherein a difference between a first and a second set of temperature values and, in addition, the difference between a first and a second set of speeds of a coolant flow are measured. These differences are evaluated by means of a data acquisition system, and power losses of the heat exchanger are displayed on a display.

US 2015/0094988 A1 presents a sensor architecture for a process system of sensors for acquiring measurement values and a logic unit for evaluating the sensor measurement values and for determining variables which can be impossible, difficult or only very expensive to measure directly. For this purpose, the logic unit evaluates sensor values by means of an empirical, data-based model.

EP 2 887 168 A2 describes the monitoring and control of machines with energy-generating units such as gas devices, steam devices, wind turbines or similar devices for generating electrical energy. In this context, sensor data is received from sensors. Furthermore, external data, relating, for example, to a history of the machine, is received. The sensor data and external data is analysed, and, for example, a service life is determined.

It is desirable to be able to acquire as precisely as possible characteristic variables of apparatuses such as heat exchangers, columns or containers for phase separation, which permit a conclusion to be drawn about the service life.

DISCLOSURE OF THE INVENTION

Against this background, the present invention proposes a method for acquiring a remaining service life of a process-engineering apparatus through which a fluid flows and which is embodied as a heat exchanger or as a column or as a container for phase separation, and a system composed of sensors and such computing units for the execution thereof, as well as an arrangement which is composed of such a system and a process-engineering apparatus having the features of the independent patent claims. Preferred refinements are respectively the subject of the dependent patent claims and of the description that follows.

The apparatus can expediently be embodied as a component of a process-engineering system and be connected to further system components, for example to further heat exchangers, columns or containers for phase separation.

The invention makes use of the measure of acquiring mechanical stresses as a characteristic variable which is not directly measurable, of a process-engineering apparatus through which a fluid flows and which is embodied as a heat exchanger or as a phase-separating apparatus (container with installations) or as a column (hollow narrow column with installations), on the basis of measurement values of a temperature, which originate from a plurality of sensors arranged in or on the process-engineering apparatus through which a fluid flows. The remaining service life is acquired from the mechanical stress, as a further characteristic variable which is not directly measurable. In this context, a characteristic variable which is not directly measurable can be understood to be, in particular a variable which characterizes the apparatus, and which cannot be acquired directly in terms of measurement technology using the sensors which are present.

According to the invention, prevailing mechanical stresses, in particular in the form of stress levels or stress profiles, are determined from temperature measurement values, and the remaining service life is acquired therefrom as a further characteristic variable which is not directly measurable. For this purpose, in a first step, mechanical stresses, in particular in the form of stress levels or stress profiles, prevailing in the material of the process-engineering apparatus, are calculated on the basis of the temperature measurement values, e.g. by means of the application of equivalent models (surrogate modelling) or machine learning.

It has in fact become apparent that the service life of a process-engineering apparatus through which a fluid flows is determined decisively by the number of changes in stress of a specific variable. Such changes in stress typically occur when the apparatus is powered up, when changing over between different operating scenarios or as result of process disruption which is caused, for example, by machine faults or valve faults. In general, the used-up lifetime depends to a great extent on how the process is operated but the operating personnel usually receives no clear indication of the influence of the operation on the stress levels which occur in the material of the apparatus, and as result on the expected service life.

The invention makes it possible to determine in real-time mechanical stresses in the material (usually metal) of process-engineering apparatuses through which a fluid flows, and to estimate therefrom the remaining service life and, if desired, other characteristic variables which are not directly measurable. This can preferably be used for condition monitoring and/or predictive maintenance of the apparatus. This can preferably also be used for predictive control of ("advanced control") of the apparatus, wherein the apparatus is operated, for example, in such a way that a desired service life remains. If, for example, it is detected that the remaining service life is too short, for example undershooting a threshold value, the apparatus can be operated in future in such a way that fewer stress changes occur and therefore the remaining service life does not drop further, or even increases again.

A computing unit, which is coupled in a data-transmitting fashion to a remote computing unit (e.g. server or so-called "Cloud"), is mounted on the apparatus. According to the invention, the mechanical stress is acquired by means of the computing unit, the mechanical stress and/or the measurement values of the temperature are transmitted to the remote computing unit, and the remaining service life is acquired there. Alternatively, according to the invention, the measurement values of the temperature are transmitted to the remote computing unit, and the mechanical stress and the remaining service life are acquired there.

Therefore, within the scope of the present invention, the acquired characteristic variable, that is to say the acquired mechanical stress, and/or the measurement values of the temperature are transmitted to the remote computing unit, and the remaining service life is determined there as at least one further characteristic variable which is not directly measurable. As a result, in particular it is possible to acquire characteristic variables on the basis of data from a plurality of apparatuses, and/or characteristic variables whose acquisition exceeds the computing capacity and/or storage capacity of the local computing units which are used.

In this context, the remote computing unit can be understood to be, in particular, a computing unit which is not mounted on the apparatus and which can be located at a very large distance therefrom and at the same time does not necessarily have to be located in the same building. The computer unit which is mounted on the apparatus expediently has a communication connection to the remote computing unit via a network, in particular via the Internet. In particular, the remote compiling unit is embodied as a server, expediently as part of a remote, distributed computing unit system in accordance with Cloud computing. IT structures, such as e.g. data memories, can be adapted dynamically to demand by means of Cloud computing and made available via a network. In particular, the computing unit which is mounted on the apparatus can therefore be made small and the more complex computing operations can be exported to the remote computing unit, that is to say to the Cloud.

In particular, the apparatus can therefore be networked within the course of what is referred to as "Industry 4.0". This is to be understood as the networking of machine equipment and system equipment and, in particular, also their connection to the Internet or the Internet of Things. Internet of Things devices which are networked in such a way can be, for example, computing units, a control system, control unit, sensors, actuators or other machine components of a machine which are networked to one another via a network, in particular the Internet.

Therefore, the apparatus is already preferably equipped with sensors and the computing unit (as part of the system according to the invention), and therefore to a certain extent with its own "intelligence" independently of the system controller. The acquired mechanical stress can, as a characteristic variable which is not directly measurable, then be used or processed further, in particular, in the process-engineering system and/or externally (e.g. at a maintenance company). Said mechanical stress can be employed, for example, for condition monitoring and/or maintenance ("predictive maintenance") and/or control ("advanced control").

The acquired service life and/or other characteristic variables which are not directly measurable and which are acquired by the external computing unit can advantageously be transferred to the computing unit from the external computing unit. The characteristic variables, or these characteristic variables, can be stored in the computing unit on the apparatus and re-used e.g. for condition monitoring or predictive maintenance or other purposes, for example the system operation of the system control.

The mechanical stress is preferably acquired as a characteristic variable (essentially) in real-time, with the result that it is available ad hoc for further purposes, in particular for the acquisition of the service life. In particular physical or data-driven equivalent models or equivalent models which are trained by machine-learning algorithms can be used for this purpose. Therefore, the invention acts to certain extent like a "smart sensor" which "measures" the characteristic variable of interest. Further characteristic variables can also advantageously be determined, for example a service life which has been used up, inner fouling incorrect distribution of a process flow or of process flows (for example an uneven distribution of a process flow among the individual passages of a plate-type heat exchanger, resulting in a reduction of the heat transmission capacity, or the non-uniform distribution of a gas flow and fluid flow over the cross-section in a column, leading to a reduced material exchange capacity).

For acquisition of a characteristic variable in real-time, a sufficiently large number of measurement values must be available, ideally from different locations. However, the process-engineering apparatuses are conventionally not equipped with sensors, or at least not to the required extent. Therefore, the process-engineering apparatus is preferably already planned correspondingly during the design phase and equipped with a sufficiently large number of sensors during manufacture, said sensors permitting later acquisition of the characteristic variable in real-time. These sensors are an integral component of a preferred element of a process-engineering apparatus according to the invention and are positioned on the surface or in the material of the process-engineering apparatus.

In addition to the presence of corresponding sensors, the measurement and signal processing is an important aspect when acquiring a characteristic variable. One or more suitable computing units, such as, in particular, what are referred to as single-board computers (SBC), such as a Raspberry Pi or Arduino, can be used for this. A single-board computer is a computer system in which all the electrical components which are necessary for operation are combined on a single circuit board. Owing to the computing capacity and the operating system which is present they are able to acquire and process the sensor data in a flexible way (if appropriate by means of signal processing methods such as e.g. outlier determination, smoothing and filtering). They are robust and reliable and small in size. They therefore meet well the important requirements for use in the industrial field. Moreover, single-board computers are usually very cost-effective. Furthermore, they have a sufficiently large number of connections, in particular what are referred to as general-purpose input/output (GPIO) connections. Because of the availability of Wi-Fi, LAN, Bluetooth and other telecommunication technologies, such as, for example, LTE, the data can be transmitted remotely particularly easily to the remote computing unit (server or what is referred to as the "Cloud"). If a network connection is currently not available for the transmission or if the data is transmitted only on request, the on-board memory is expediently used to buffer the data.

A connection of the computing unit/units to the process control system (PLS, Distributed Control System, DCS or Process Control System, PCS), which is used to control the process-engineering system, is not absolutely necessary, since the computing unit or the remote computing unit is used to acquire the characteristic variable or to acquire the remaining service life, which usually has nothing to do with the actual operation of the system. Disconnection from the network which is therefore possible is beneficial for safety aspects. However, it can be advantageous that measurement values which are not measured by means of the sensors (also referred to as external measurement values), in particular inlet temperatures and outlet temperatures and/or measurement values relating to the surroundings (temperature of the surroundings, air pressure, air humidity etc.) are also included, along with the measurement values, in the acquisition of the characteristic variables. In particular, the measurement values relating to the surroundings can also originate from third parties, such as e.g. weather services etc.

Preferably virtual measurement values of a target variable also determined from the "measured and/or external" measurement values in the computing unit and/or the remote computing unit. In particular for the case in which the measurement values of the sensors which are specially provided for this purpose and the specified external measurement values are not sufficient for a qualitatively sufficient acquisition of a characteristic variable, what are referred to as virtual sensors or soft sensors are preferably made available by the computing unit. These are based on dependence of the target variable on representative measurement variables. Therefore, the target variable is not measured directly but instead calculated on the basis of the measurement variables to be correlated with it and a model of the correlation or dependence. The acquisition of the dependence can take place here in different ways, for example using models, artificial neural networks or multivariant methods. The soft sensors are preferably based on ab-initio models, empirical models or data-based models of the apparatus and/or adjacent system parts.

Overall, the system composed of sensors and at least one computing unit which is mounted on the apparatus and a remote computing unit which is coupled thereto in a data-transmitting fashion can advantageously be used to acquire sensor data, filter them on demand, calculate further outputs, such as e.g. measurement variables which are missing or are not directly available (internal temperatures, phase state) on demand, and to acquire characteristic variables. The resulting data is preferably stored in the remote computing and/or transferred to the computing unit from the remote computing unit. In particular, the use of single-board computers with Cloud technology is a very flexible and cost-effective solution for obtaining sensor data and for making available soft sensor data.

The heat exchanger is preferably embodied as a plate-type or helically coiled heat exchanger, particular as a two-flow or multi-flow heat exchanger. The column is preferably a base-to-base column or a packing column or a filling body column for rectification, absorption or physical washing.

Heat exchangers are known in numerous embodiments. Basically, heat exchangers are designed to permit an exchange of heat between fluids (gases or liquids) which flow through. The fluids remain spatially separated here so that no mixing occurs between them. The quantities of heat which are exchanged by the fluids therefore flow through the structures of the heat exchanger which separate the fluids. A plate-type heat exchanger has a multiplicity of chambers or passages which are formed by plates and through which the fluids can flow. A passage can have heat-exchanging profiles, referred to as fins, through which or along which the respective fluid flows. In particular, plate-type heat exchangers are subject, owing to their specific design with a large number of chambers through which fluid flows at different temperatures, to severe, stress-caused material fatigue, for which reason the invention is particularly suitable for them.

Owing to the activity of single-board computers and the available operating systems, owing to the Cloud connectivity and the available GPIO connections, a system composed of a sensor or sensors and a single-board computer can be used for all types of system components on which sensors are installed, and for all types of measurement values. In particular in surroundings in which the system manufacturer/servicer does not have any direct access to the system measurement values of the operator, this process can be used to generate and collect data which is necessary for a desired further analysis.

A method which can be implemented with this approach is e.g. the performance monitoring of helically coiled heat exchangers. For this type of heat exchangers, a three-dimensional temperature distribution can be obtained by means of optical fiber measurements. The data collection can then be carried out by means of the herein described methods, wherein the data analysis is preferably directed at thermal gradients which are observed in different sections, and potential incorrect distributions of a process flow or of process flows. In addition to temperature sensors, pressure sensors and flow rate sensors, acoustic sensors are also useful for monitoring vibrations in the coiled heat exchanger. From all this information is possible to derive indications of the integrity of lines and of their suspension means.

A further possible advantageous use of such systems is to monitor tanks in which order is automatically generated if the filling level drops below a certain threshold. Here, the filling level can be monitored continuously by means of suitable sensors, and during the evaluation it is possible, in particular, to use prediction models in order to be able to estimate the ideal re-ordering time and/or the re-ordering quantity as well as possible.

A further advantageous possible use of such systems is to monitor the quality of the separation of the gas phase and liquid phase in a phase-separating apparatus or in a column. In addition to surface temperatures and interior flow temperatures it is additionally preferably possible to acquire flow rates and pressure losses as measurement values. From these measurement values it is possible to acquire not only mechanical stresses and the remaining service life as characteristic variables which are not directly measurable but preferably a degree of separation of the gas phase and liquid phase. Through the measurement of optical properties of the gas phase it is also expediently possible to acquire the residual quantity of fluid in the gas phase. On the basis of the liquid portion which is determined in this way it is possible to protect downstream liquid-sensitive apparatuses, for example compressors, against liquid through suitable process control.

One further advantageous possible use of such systems is the predictive maintenance for large systems, such as e.g. steam crackers or reformers. By using a multiplicity of the above-mentioned systems it is possible to collect and evaluate a large amount of real and virtual sensor data in a computing centre or a Cloud. On the basis of the evaluation it is then possible to estimate a need for maintenance (e.g. de-coking, repairing, replacement). At the same time, the collection of data and the evaluation also possibly permit the detection of weak points and the improvement of future systems.

Within the scope of the invention, a flexible method is presented for implementing sensors in process-engineering apparatuses and for accessing the sensor data for the acquisition of a characteristic variable of the remaining service life in real-time (online). In addition, the invention proposes what are referred to as soft sensors in single-board computers which generate estimated values for sensor variables which are not directly accessible, on the basis of process variables using ab-initio simulations or optimizations.

The implementation of the method in the form of a computer program is also advantageous, since this entails particularly low costs, in particular if a control unit which is to be implemented is also used for other tasks and is therefore present in any case. Suitable data carriers for making available the computer program are, in particular, magnetic, optical and electrical memories, such as e.g. hard disks, flash memories, EEPROMs, DVDs and the like. A download of a program via computer networks (Internet, Intranet etc.) is also possible.

Further advantages and configurations of the invention are evident from the description and the accompanying drawings.

The invention is schematically illustrated in the drawings on the basis of exemplary embodiments and is described below with reference to the drawings.

DETAILED DESCRIPTION OF THE DRAWINGS

Figure 1:
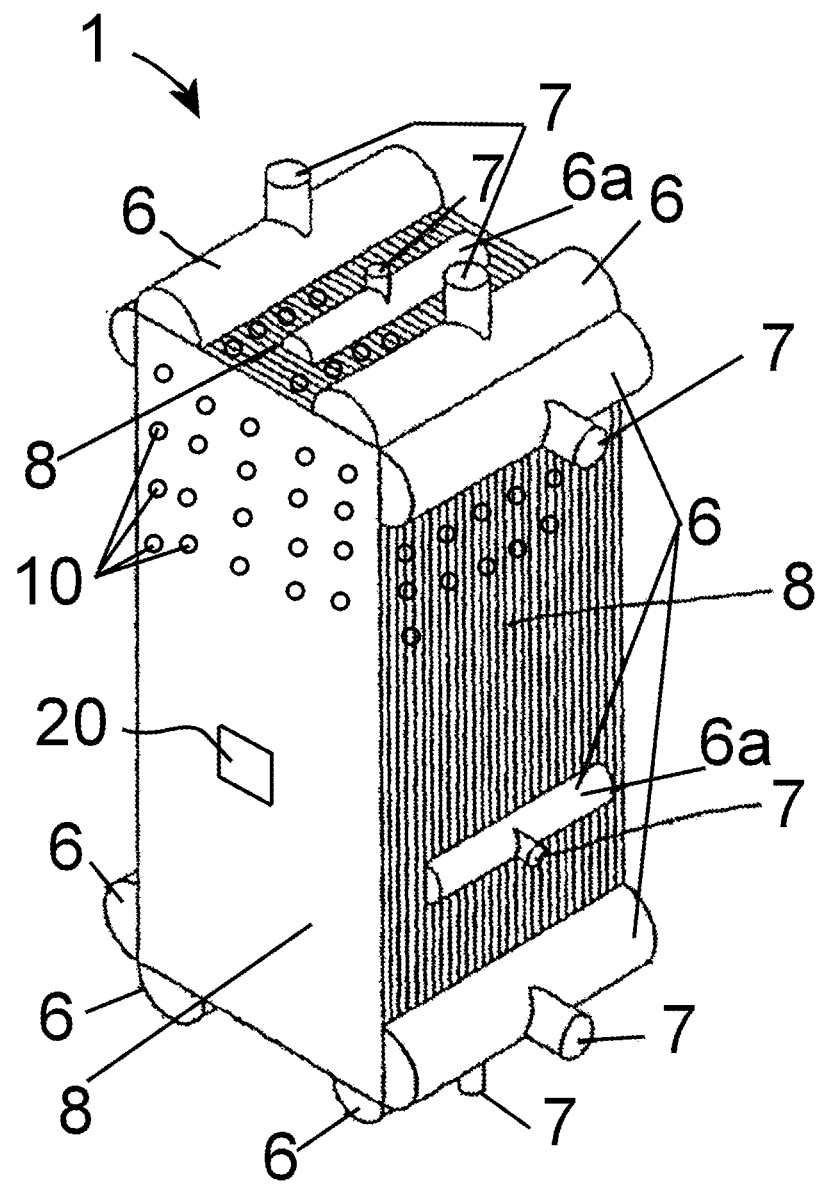
FIG. 1 shows schematically and perspectively a plate-type heat exchanger from the outside with a number of added components.

FIG. 1 shows from the outside a process-engineering apparatus embodied here as a plate-type heat exchanger 1. The plate-type heat exchanger has a cuboid central body 8 with a length of, for example, several metres and a width and height of, for example, approximately 1 m or a few metres. On top of the central body 8, at its sides and under the central body 8, attachments 6 and 6a can be seen. The attachments 6 and 6a which are located underneath the central body 8 and on the side facing away from the illustrated side are partially concealed.

A fluid or process flow can be fed to the plate-type heat exchanger and removed again from it through connecting elements 7. The attachments 6 and 6a serve for distributing the fluid introduced through the connecting elements 7 and for collecting and concentrating the fluid to be removed from the plate type heat exchanger. Within the plate type heat exchanger, the various flows of fluid then exchange thermal energy.

The plate type heat exchanger shown in FIG. 1 is designed to make more than two flows of fluid pass by one another in separate passages for heat exchange. Some of the flows can be made to pass by one another counter-currently, others cross-currently or concurrently.

The central body 8 is essentially an arrangement of separating plates, heat-exchanging profiles (referred to as fins) and distributor profiles. There are alternating separating plates and layers having profiles. A layer which has a heat-exchanging profile and distributor profiles is referred to as a passage.

The central body 8 therefore has alternately passages 14 and separating plates lying parallel to the directions of flow. Both the separating plates and the passages are usually fabricated from aluminium. To their sides, the passages are closed off by bars made of aluminium, and so a side wall is formed by the stacked structure with the separating plates. The passages lying on the outside of the central body are covered by a covering made of aluminium lying parallel to the passages and the separating plates.

Such a central body 8 can be manufactured e.g. by applying a brazing solder to the surfaces of the separating plates and subsequently stacking the separating plates and the passages alternately one on top of the other. The coverings cover the central body 8 at the top or bottom. The central body was subsequently brazed by heating in a furnace.

On the sides of the plate-type heat exchanger, the distributing profiles have distributing profile accesses. Through these, the fluid can be introduced into the associated passages from the outside and also removed again via the attachments 6 and 6a and connecting elements 7. The distributing profile accesses are concealed by the attachments 6 and 6a.

EP 1 798 508 A1 discloses determining the stress distribution by simulation of the temperature distribution, based on the heat flows, in the plate-type heat exchanger. The risk of failures can be estimated on the basis of these simulated stress distributions. To determine the stress distribution in a plate-type heat exchanger, first the spatial temperature distribution is determined here on the basis of a layer model and the stress distribution is calculated therefrom.

Within the scope of an embodiment of the invention, it is now proposed to equip the plate-type heat exchanger with a sufficiently large number of sensors, embodied here as temperature sensors 10, and in a first step to determine the stress distribution as the characteristic variable which is of interest and is not directly measurable, on the basis of the sensor data. The temperature sensors 10 are coupled in a data-transmitting fashion to a computing unit 20, which is preferably also arranged on the plate-type heat exchanger. Although the temperature sensors 10 are relatively large distances from one another in the figure, in practice they are advantageously distributed in a close fashion in order to be able to measure the temperature distribution with sufficient resolution.

Figure 2:
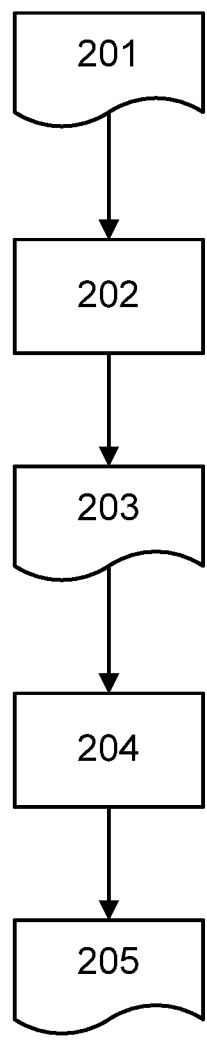
FIG. 2 shows a method according to an embodiment of the invention schematically in a flowchart.

According to the preferred embodiment of the invention illustrated here, the computing unit 20 is embodied as a single-board computer and is designed to carry out a method according to the invention as indicated schematically in FIG. 2.

In a step 201, a number of temperature measurement values are acquired as measurement values by means of the temperature sensors 10 and fed to the computing unit 20.

In a step 202, the temperature measurement values are evaluated, in particular using models for determining stresses prevailing in the material (203). These stresses are determined, in particular with spatial and chronological resolution, with the result that, in particular, location-dependent and time-dependent stress profiles can be determined. The stresses or stress profiles constitute a characteristic variable which is not directly measurable These are fed to a service life estimating means 204, wherein a remaining service life is determined as a further characteristic variable which is not directly measurable (205). The determination makes use, in particular, of the acquisition of stress fluctuations and the comparison thereof with one or more predefined threshold values. The greater the local fluctuation in the stress, the greater the loading of the material and the shorter the remaining service life. A severe fluctuation comprises here both a large absolute change and a rapid relative change, i.e. with a large gradient.

The individual steps take place, in particular, (quasi) continuously, in order to permit continuous monitoring of the apparatus 1.

Figure 3:
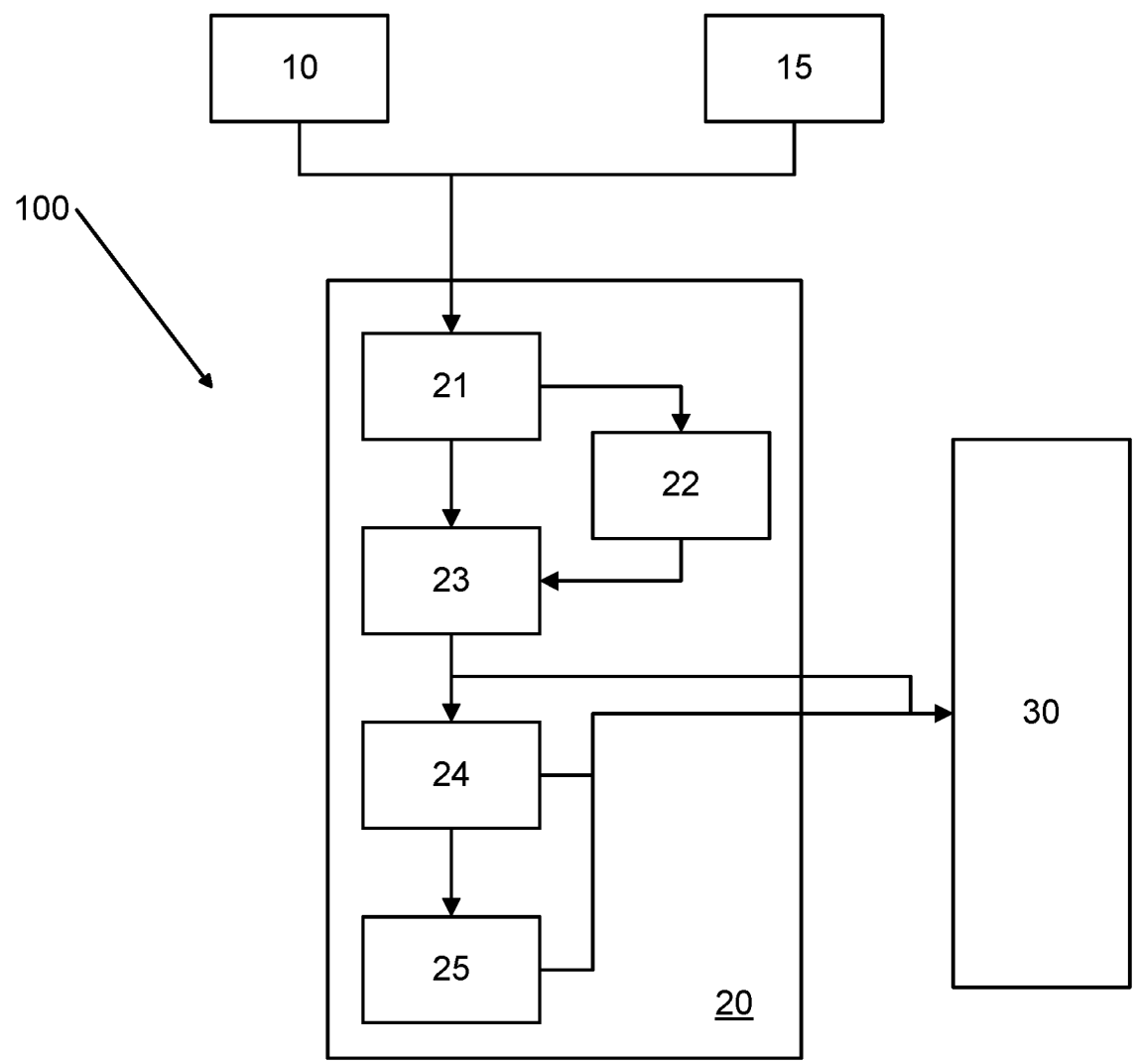
FIG. 3 shows a method according to an embodiment of the invention schematically in a block diagram.

FIG. 3 shows a system according to the invention 100 according to a preferred embodiment of the invention schematically in a block diagram. The system 100 has, as explained, a plurality of sensors 10 which are embodied, particular, as temperature sensors, a computing unit 20 which is coupled to the latter in a data-transmitting fashion and is preferably embodied as a single-board computer, and a remote computing unit 30 ("Cloud") which is coupled to the computing unit 20 in a data-transmitting fashion.

The computing unit 20 is preferably also supplied with further data 15, such as for example data of the process control system and/or historic data and/or data relating to the surroundings. Said data can be understood as being external measurement values.

Overall, numerous (internal and external) measurement values are therefore available (21) in the computing unit 20, both from the process and from the surroundings. In addition to the temperature measurement values, these values can be, in particular, flow rate measurement values, pressure measurement values and other temperature measurement values, such as inlet temperatures and outlet temperatures, the composition and the liquid portion or gas portion of the fluid (7) or temperatures of the surroundings.

According to one preferred embodiment of the invention, one or more what are referred to as soft sensors 22 can also be implemented in the computing unit 20, said soft sensors 22 calculating, from the available measurement values 21 one or more virtual measurement values of target variables which are not readily accessible for measurement.

The real (internal and/or external) measurement values 21 and virtual measurement values 22 are fed to an evaluation means 23 which acquires, in a first step, temperature profiles prevailing, in particular, in the monitored apparatus 1.

Alternatively or additionally, the temperature measurement values and/or temperature profiles can be transmitted to the remote computing unit 30.

According to one preferred embodiment of the invention, in a step 24, stress profiles are acquired, as characteristic variables which are not directly measurable, from the temperature profiles in the computing unit 20, wherein the calculation can be based, in particular, on models, such as, for example, data-based meta-models, together with an estimation algorithm (filter or observer). The stress profiles or stress values are transmitted in a step 25 to the remote computing unit 30 for storage and/or further processing.

Alternately, the stress profiles can also be acquired from the temperature profiles in the remote computing unit 30.

In the remote computing unit 30, a remaining service life of the apparatus 1 is estimated, as a characteristic variable which is not directly measurable, from the stress profiles. The result can be stored and/or further processed in the remote computing unit 30. Alternatively or additionally, the result can also be transmitted from the remote computing unit 30 to the computing unit 20 for storage and/or further processing.

It is also conceivable for the remaining service life of the apparatus 1 to be estimated, as a characteristic variable which is not directly measurable, from the stress values or stress profiles in the computing unit 20.

The remaining service life and/or any further characteristic variable which is not directly measurable, can be re-used or processed further, in particular in the process-engineering system and/or externally (e.g. at a maintenance company). Said remaining service life and/or further characteristic variable which is not directly measurable can be employed, for example, for condition monitoring and/or maintenance ("predictive maintenance") and/or control ("advanced control") of the apparatus or of the entire system, respectively.

The invention claimed is:

1. A method for determining a remaining service life of a process-engineering apparatus (1) through which a fluid flows, wherein said apparatus is a heat exchanger, a column, or a container for phase separation, said method comprising:
   mounting a computing unit (20) on said apparatus (1), wherein the computing unit (20) is coupled to a remote computing unit (30) in a data-transmitting fashion,
   obtaining measurement values of a temperature by means of a plurality of sensors (10) which are arranged in or on said apparatus (1),
   determining a mechanical stress from the measurement values of the temperature as a characteristic variable which is not directly measureable, and
   determining the remaining service life of said apparatus from the mechanical stress, as a further characteristic variable which is not directly measureable,
   wherein
   (a) the mechanical stress is acquired by means of the computing unit (20), the mechanical stress and/or the measurement values of the temperature are transmitted to the remote computing unit (30), and the remaining service life determined by means of the remote computing unit (30), or
   (b) the measurement values of the temperature are transmitted to the remote computing device (30), and the mechanical stress and the remaining service life are determined by means of the remote computing unit (30).

2. The method according to claim 1, wherein the computing unit (20) is a single-board computer.

3. The method according to claim 2, wherein the remote computing unit (30) is a server.

4. The method according to claim 2, wherein the remote computing unit (30) is a Cloud.

5. The method according to claim 1, wherein, in addition to the measurement values of the temperature, measurement values for at least one variable are selected from a pressure, a through-flow rate, a through-flow composition, an expansion rate, an oscillation rate, a variation rate or rate of refraction or absorption of electromagnetic waves are obtained by means of a plurality of sensors (10) arranged in or on said apparatus (1).

6. The method according to claim 1, wherein, in addition to the remaining service life, at least one further characteristic variable which is not directly measurable is determined by means of the computing unit (20) which is mounted on said apparatus (1) and/or by means of the remote computing unit (30), wherein the at least one further characteristic variable which is not directly measurable is selected from a group which comprises a service life which has been used up, inner fouling, incorrect distribution of a process flow, a local temperature and concentration distribution, a local temperature gradient and a liquid portion or gas portion of a process flow.

7. The method according to claim 1, wherein at least one further measurement variable which is directly measurable is used for condition monitoring and/or predictive maintenance and/or control of said apparatus (1) through which a fluid flows.

8. The method according to claim 1, wherein at least one further measurement variable which is not directly measurable is transmitted from the remote computing unit (30) to the computing unit (20).

9. The method according to claim 1, wherein the mechanical stress is determined as a characteristic variable which is not directly measurable, by applying physical or data-driven equivalent models or by equivalent models which are trained by machine-learning algorithms.

10. The method according to claim 1, wherein the acquisition of the mechanical stress as a characteristic variable which is not directly measurable is additionally carried out on the basis of at least one measurement value which is not acquired by means of sensors (10) arranged in or on said apparatus (1).

11. The method according to claim 1, wherein at least one virtual measurement value of a target variable is determined from the measurement values.

12. The method according to claim 1, wherein prevailing mechanical stresses in the form of stress levels or stress profiles are determined from the measurement values of the temperature, and the remaining service life is determined therefrom.

13. The method according to claim 12, wherein a number of changes in stress are determined with a predetermined variable.

14. The method according to claim 1, wherein said apparatus (1) through which a fluid flows is a plate-type heat exchanger or helically coiled heat exchanger.

15. A system comprising a number of sensors (10) which are arranged in or on a process-engineering apparatus (1) through which a fluid flows, wherein the apparatus is a heat exchanger, a column, or a container for phase separation, a computing unit (20) which is coupled in a data-transmitting fashion to said sensors (10) and is mounted on the apparatus (1), and a remote computing unit (30) which is coupled in a data-transmitting fashion to said sensors (10), said system (100) having means for carrying out a method according to claim 1.

16. An arrangement comprising a process-engineering apparatus (1) through which a fluid flows, wherein the apparatus is a heat exchanger, a column, or a container for phase separation, and a system according to claim 15.

17. The method according to claim 1, wherein the remote computing unit (30) is a server.

18. The method according to claim 1, wherein the remote computing unit (30) is a Cloud.

19. The method according to claim 1, wherein, in addition to the remaining service life, at least one further characteristic variable which is not directly measurable is determined by means of the computing unit (20) which is mounted on said apparatus (1), wherein the at least one further characteristic variable which is not directly measurable is selected from a group which comprises a service life which has been used up, inner fouling, incorrect distribution of a process flow, a local temperature and concentration distribution, a local temperature gradient and a liquid portion or gas portion of a process flow.

20. The method according to claim 1, wherein, in addition to the remaining service life, at least one further characteristic variable which is not directly measurable is determined by means of the remote computing unit (30), wherein the at least one further characteristic variable which is not directly measurable is selected from a group which comprises a service life which has been used up, inner fouling, incorrect distribution of a process flow, a local temperature and concentration distribution, a local temperature gradient and a liquid portion or gas portion of a process flow.

21. The method according to claim 1, wherein at least one further measurement variable which is directly measurable is used for condition monitoring, predictive maintenance, and control of said apparatus (1) through which a fluid flows.

* * * * *